Patented July 4, 1933

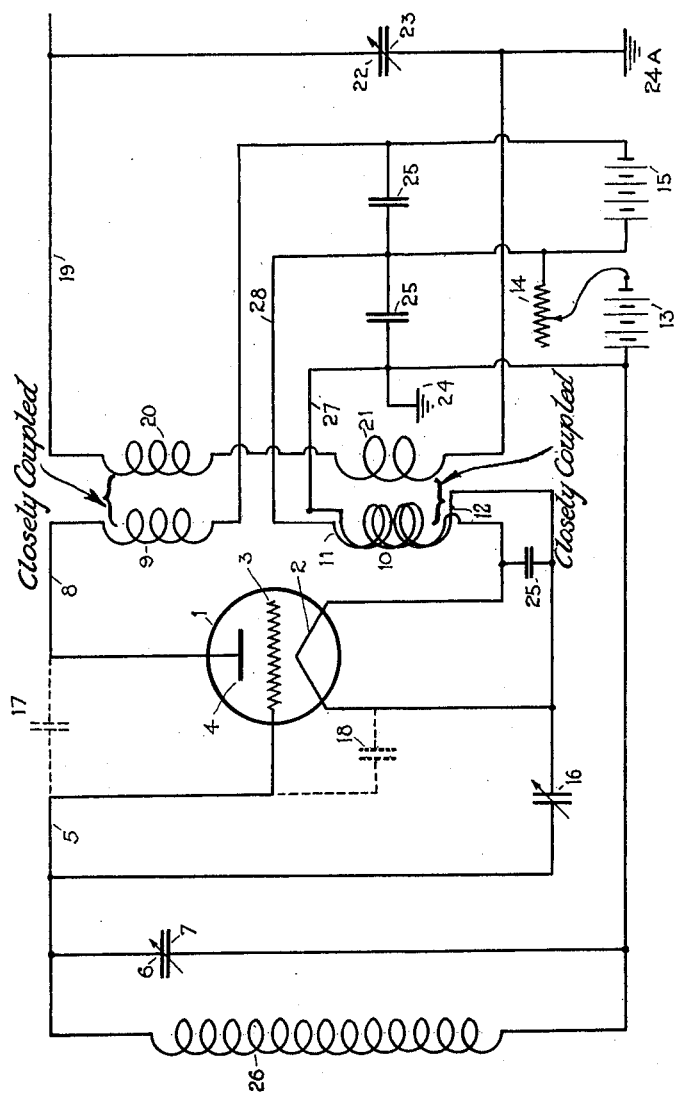

1,917,204

UNITED STATES PATENT OFFICE

LAWRENCE C. F. HORLE, OF NEWARK, NEW JERSEY

INDUCTIVE COUPLING ARRANGEMENT FOR ELECTRON TUBE CIRCUITS

Application filed January 24, 1930. Serial No. 423,037.

This application is a continuation in part of my application Serial No. 109,565 filed May 17, 1926. A vacuum tube amplifier circuit arrangement is disclosed in said application in which an inductive element which forms part of a circuit carrying alternating current energy of signal frequency is arranged also to carry current for heating the cathode of the tube. The present application is directed specifically to certain methods of attaining this feature of the invention disclosed in said application.

The invention will be understood by reference to the following description and to the accompanying drawing.

In the figure there is shown diagrammatically an embodiment of the invention in a single-stage amplifier system comprising a vacuum tube with the usual three electrodes, cathode anode, and control electrode, the circuits being arranged in bridge form to attain neutralization of the feed-back from the anode circuit to the control electrode circuit.

Referring to the figure, vacuum tube 1 comprises cathode or filament 2, control electrode 3, and anode or plate 4. The control electrode or grid 3 is connected in an input circuit 5, one side of which is grounded to a convenient ground such as a frame element 24.

The input circuit 5 comprises an inductive element, winding 26, on which incoming oscillations may be impressed. The tuning means for said circuit may include the variable condenser 6, connected across the wnding 26, of which the side 7 may be considered the rotor. The anode 4 is connected in a cathode-anode circuit 8, comprising, in series, the coil 9 and the inductive element 10. The inductive element 10 is composed of coupled coils, as 11 and 12, which are preferably closely coupled. This close coupling may be attained by applying the windings 11 and 12 closely adjacent and parallel throughout their length.

A cathode current source such as battery 13 supplies heating current, regulated by rheostat 14, for the cathode, through the coils 11 and 12. An anode current source such as the battery 15 is connected into the cathode-anode circuit, preferably between coils 9 and 11, through the connection 28 as shown. This current source may also be connected between coils 9 and 12. The condenser 16 is connected across the cathode and control electrode 3. The condensers 17 and 18, shown in dotted line, represent respectively the inherent capacity between control electrode and anode circuits and between control electrode and cathode. The cathode-anode circuit 8 is inductively coupled to an output circuit 19, one side of which is grounded, as to a frame element 24—A, and which comprises coils 20 and 21, coupled with coil 9 and inductive element 10. The circuit 19 may be tuned as by a variable condenser 22 of which the side 23 is to be considered the rotor. The rotor 7, of condenser 6, and the current source 13, are grounded to a convenient ground such as the frame element 24. Likewise, rotor 23, of condenser 22, is grounded as to frame element 24—A. The radio-frequency by-pass condenser 25 may be included. The sense of winding of coil 9 and of coils 11—12 should be such that the instantaneous value of the alternating component of the voltage with respect to ground on anode 4 is at any instant of polarity opposite to the polarity of the instantaneous value of the alternating component of the voltage with respect to ground on cathode 2. As shown in the figure, coil 20 is wound in the same sense as coil 21, and coil 9 will be wound in the same sense as coils 11—12, and these coils are connected to have the voltages applied in proper opposed relation.

In operation, incoming signals from any outside source are impressed by way of the input circuit 5, between control-electrode and cathode, and the resultant amplified voltage in the anode circuit is impressed on the output circuit 19. Oscillations caused by the feed-back from the anode-cathode circuit 8 to control electrode-cathode circuit 5 through the electrostatic coupling formed by the inherent capacity 17 between control electrode and anode circuits, are controlled or neutralized by the balanced bridge action which is incorporated in the system.

In the adaptation of certain circuit arrangements, various difficulties caused by undesirable capacity effects between parts of the system, or between circuit elements and ground, may arise. One such difficulty involves the necessary connection of the cathode current source into the system at such point or points as to permit of the bringing of one side of a circuit, such as the input circuit 5, to the same potential as a terminal of the current source, or to permit of the simultaneous grounding, as on the ground mass 24, of one side of such circuit and a terminal of said current source. The problem is met by arranging the circuits in such a manner that the cathode as a whole, or the cathode portion of the heating current circuit, is at a potential different from ground, or different from the potential of either terminal of the cathode current source. The cathode is removed from such ground or current source potential by the inductive element 10. In order to provide a path from the current source to the cathode portion of the heating circuit, said inductive element is constructed in the form of coils conductively separated but inductively coupled. Any coupled coils of suitable type may be employed. The duplex-wound coils are among those which are suitable.

The essential requirement is that the effective impedance of each winding, which consists of its self-impedance plus the impedance reflected into it by the circuit 20—21—22 to which it is coupled, shall be equal to that of the other winding. This may be substantially realized by maintaining the coupling of the coil 11 to circuit 20—21—22 at a high value and substantially equal with the coupling of coil 12 to circuit 20—21—22, under which conditions the reflected impedance is the predominant portion of the total impedance. Similarly, the predominance of reflected impedance can be realized in coils 9 by its being closely coupled to circuit 20—21—22. Failure to realize these conditions will result in a loss of amplification through the power wasted in the primary windings 9 and 10 and the circulation of radio-frequency currents in the filament proper.

The cathode battery 13, or other current source, is, thus, not connected into the cathode heating current circuit adjacent the cathode portion of said circuit, since such placing would result in separating the current source from the grounding mass 24 by the inductive element 10. Utilizing the inductive element 10 as part of the cathode heating current circuit, the current source such as battery 13, is connected to the cathode portion of this heating circuit through the coils 11 and 12 of said inductive element. It is to be noted from the above description that in the circuit arrangement for cathode current source connections herein disclosed, a cathode current, for example a direct current provided by a battery or a heating current of any suitable character from any source, is carried from the current source to the cathode, or to the cathode portion of the heating circuit, over conductive elements, which in themselves are part of an inductive element carrying alternating current energy of radio or other frequency. It will be apparent that the bringing of a certain circuit element in a vacuum tube amplifier system to the potential of a terminal of the cathode heating current source, or the proper grounding of certain circuit elements, for example in the present case an input circuit, and at the same time of a current source to some common ground mass such as a frame element (24), is accomplished, in general terms, by locating the cathode or the cathode end of the cathode heating current circuit, off-ground for alternating potentials in the system, or at a different alternating potential than that of the cathode heating current source, such as battery 13.

It will be realized that many other applications of this invention other than that of the embodiment shown may be made, and that various modifications in the circuit arrangements and apparatus employed may also be made, without departing from the spirit of my invention, and I do not intend to impose any limitation on my invention except such such as is imposed by the appended claims.

I claim:

1. A thermionic device comprising a cathode, an anode, and a control electrode, a cathode heating current source, a cathode heating current circuit comprising the source and further comprising two inductive windings in series in the heating circuit and in connection respectively with opposite terminals of the source, said windings being closely inductively coupled, an input oscillation circuit comprising the cathode and control electrode and an inductive winding on which oscillations are impressed, the input circuit further comprising at least one of the windings comprised in the cathode heating circuit, an oscillation circuit comprising the cathode and anode and at least one of the windings comprised in the cathode heating circuit, said cathode-anode circuit further comprising another inductive winding, said other winding being connected into the cathode-anode circuit between the anode and one of the windings comprised in the cathode heating circuit, an output oscillation circuit comprising an inductive winding closely inductively coupled to at least one of the windings comprised in the cathode heating circuit and to said other winding connected into the cathode-anode circuit between the anode and one of the windings comprised in the cathode heating circuit.

2. A thermionic device comprising a cathode, an anode, and a control electrode, a cathode heating current source, a cathode heating current circuit comprising the source and further comprising two inductive windings in series in the heating circuit and in connection respectively with opposite terminals of the source, said windings being substantially equal and closely inductively coupled, an input oscillation circuit comprising the cathode and control electrode and an inductive winding on which oscillations are impressed, the input circuit further comprising at least one of the windings comprised in the cathode heating circuit, an oscillation circuit comprising the cathode and anode and at least one of the windings comprised in the cathode heating circuit, said cathode-anode circuit further comprising another inductive winding, said other winding being connected into the cathode-anode circuit between the anode and one of the windings comprised in the cathode heating circuit, an output oscillation circuit comprising an inductive winding closely inductively coupled to the windings comprised in the cathode heating circuit and to said other winding connected into the cathode-anode circuit between the anode and one of the windings comprised in the cathode heating circuit.

3. In an electron tube amplifier system, an electron tube having filament, grid and plate electrodes, input circuits therefor, a plate circuit, an output circuit inductively coupled to said plate circuit, said tube and its connecting wires having inherent capacities between the grid and plate and between the grid and filament, a source of filament potential, a source of plate potential, a transformer, a mutual inductance element having at least three windings, two of which windings are wound closely adjacent and substantially parallel throughout their length, said windings being in close mutual inductive relation but not in direct conductive relation, said tube input circuit comprising one of said parallel wound windings of said mutual inductance element, the respective filament terminals of said tube connected to the terminals of said source of filament potential through the respective parallel windings of said mutual inductance element, said plate circuit comprising one winding of said transformer and said source of plate potential, said output circuit comprising the other winding of said transformer and a winding of said mutual inductance element not comprised in said filament circuits, whereby oscillations cause by feed-back from plate circuit to grid circuit through said inherent capacities are controlled.

4. In an electron tube amplifier, a three-electrode electron tube having filament, grid and plate electrodes, an input circuit, a plate circuit, an output circuit inductively coupled to said plate circuit, a balanced bridge arrangement for preventing feed-back between plate circuit and input circuit having two capacity arms and two inductance arms, one of said capacity arms comprising the inherent capacity between the plate and grid of said tube and their respective leads, one of said inductance arms comprising mutual inductances inserted in the filament supply circuit and closely inductively coupled to said output circuit, the other of said inductance arms comprising an inductance connected in the plate circuit and closely inductively coupled to said output circuit.

5. In an inductively coupled electron tube amplifier system comprising a plurality of stages, a three electrode electron tube having filament, grid, and plate electrodes for each of said stages, transformers for inductively coupling each of said stages to the succeeding stage, and in each stage a balanced bridge arrangement for preventing feed-back from plate circuit to filament circuit and comprising a plurality of inductances constituting adjacent arms of said bridge arrangement in the filament to plate circuit of each stage closely magnetically coupled to the succeeding stage balancing voltages due to electrostatic coupling between plate and grid against voltages due to electrostatic coupling between filament and grid.

6. In an amplification system, a three-electrode electron tube, a grid circuit and a plate circuit therefor, an output circuit coupled to said plate circuit, and means for electro-magnetically coupling with negligible leakance said output circuit symmetrically to both sides of the filament supply circuit, said means being connected to the electrodes of said tube in such manner as to continuously apply to the plate of said tube a potential having instantaneous values of its alternating component of polarity relative to ground opposite to the polarity relative to ground of the corresponding instantaneous values of the alternating component of the potential applied to the filament.

7. In an amplification system, a three-electrode electron tube, plate circuit, grid circuit, and filament supply circuit therefor, a separate resonant output circuit, inductances in mutual inductive relation connected in each side of said filament supply circuit, an inductance connected in said output circuit, said inductances being connected for balancing voltages arising from relay action of the tube due to electrostatic coupling between plate and grid against voltages due to electrostatic coupling between grid and filament, said inductance in the output circuit being coupled to said inductances in the filament supply circuit with a degree of coupling which constitutes the impedances of said inductances in the filament supply circuit substantially entirely of the impedances reflected into said filament supply circuit from said output circuit.

8. In an amplification system, a three-electrode electron tube, plate, grid, and filament supply circuits, therefor, a separate resonant output circuit, inductances in mutual inductive relation connected in each side of said filament supply circuit, an inductance connected in said plate circuit, an inductance connected in said separate output circuit, said inductance in said output circuit being in mutual inductive relation with said inductance in the plate circuit, said inductance in the output circuit being in mutual inductive relation with said inductances in the filament supply circuit, said inductances in the filament supply and plate circuits being connected to the electrodes of said tube for balancing voltages arising from relay action of the tube due to electrostatic coupling between plate and grid against voltages due to electrostatic coupling between grid and filament, said inductance in the output circuit being coupled to said inductances in the filament supply circuit and in the plate circuit with a degree of coupling which constitutes the impedances of said inductances in said filament supply circuit and said plate circuit substantially entirely of the impedances reflected into said filament supply and plate circuits from said output circuit.

9. In an amplification system, a three-electrode electron tube, a plate circuit, a grid circuit, an output circuit, and a filament supply circuit therefor an inductance connected in said plate circuit, inductances connnected in each side of said filament supply circuit wound in the same sense and in mutual inductive relation, two adjacent terminals of the respective inductances in said filament supply circuit being respectively connected to the filament terminals of said tube, means for electromagnetically coupling with negligible leakance said inductance in said plate circuit and said inductances in said filament supply circuit to said output circuit, said inductance in the plate circuit having the terminal thereof connected to the plate which will continuously apply to the plate a potential having an alternating component of instantaneous value with respect to ground of polarity opposite to the polarity of the instantaneous value of the alternating component of the filament potential with respect to ground.

10. In an amplification system, a three-electrode electron tube, a plate circuit, a grid input circuit and a filament supply circuit therefor, a separate output circuit, an inductance in said plate circuit an inductance in said output circuit, a pair of inductances respectively connected in each side of said filament supply circuit wound in the same sense and in mutual inductive relation, adjacent terminals of the respective inductances in said filament supply circuit being respectively connected to the terminals of the filament, the remaining terminal of one of the inductances in the filament supply circuit being connected to the grid input circuit of said tube, the remaining terminal of the other of said inductances in the filament supply circuit being connected to one terminal of said inductance in the plate circuit, and the other terminal of said inductance in the plate supply circuit being connected to the plate of said tube, said inductance in said output circuit being in close mutual inductive relation with said inductance in said plate circuit and with said inductances in said filament supply circuit, the connection of said plate being made to the terminal of said inductance in said plate circuit which will continuously apply to the plate a potential having an alternating component of instantaneous value with respect to ground of polarity opposite to the polarity of the instantaneous value of the alternating component of the filament potential with respect to ground.

In testimony whereof I affix my signature.

LAWRENCE C. F. HORLE.